April 14, 1942. J. M. DOWNER 2,279,863
PACKING ARRANGEMENT
Filed Sept. 28, 1940

Inventor:
John M. Downer,
by Harry E. Dunham
His Attorney.

Patented Apr. 14, 1942

2,279,863

UNITED STATES PATENT OFFICE 2,279,863

PACKING ARRANGEMENT

John M. Downer, Schenectady, N. Y., assignor to General Electric Company, a corporation of New York Application September 28, 1940, Serial No. 358,853

5 Claims. (Cl. 286—10)

The present invention relates to packing arrangements for reducing the leakage of fluid from a casing along a shaft passing through an opening in the casing. More specifically, the invention relates to the type of packing arrangements which include a packing ring or rings having a plurality of segments and means for holding such segments in sealing position. In carbon type packings with packing rings composed of a plurality of segments it is customary to bias the segments towards each other, that is, into archbound relation. In labyrinth type packings using steel rings composed of a plurality of segments with grooved sealing surfaces it is customary to bias the segments towards shoulders formed by the packing casing so that the segments are practically archbound with their adjacent end faces either engaging each other or forming a clearance of a few mils only. Difficulties have been experienced with arrangements including springs as a means to hold the packing ring segments in position. The difficulties are partly due to changes of the spring characteristics effected at high temperatures.

The object of my invention is to provide an improved construction and arrangement of packings of the type above specified which may be safely operated at high temperatures as occur in modern elastic fluid turbines. This is accomplished in accordance with my invention by the provision of hydraulically actuated means for holding the ring segments in position. In a preferred embodiment of my invention each ring segment is engaged by a hydraulically actuated piston movably disposed in a cylinder and subject to fluid pressure therein.

For a better understanding of what I believe to be novel and my invention, attention is directed to the following description and the claims appended thereto in connection with the accompanying drawing.

Figure 1:
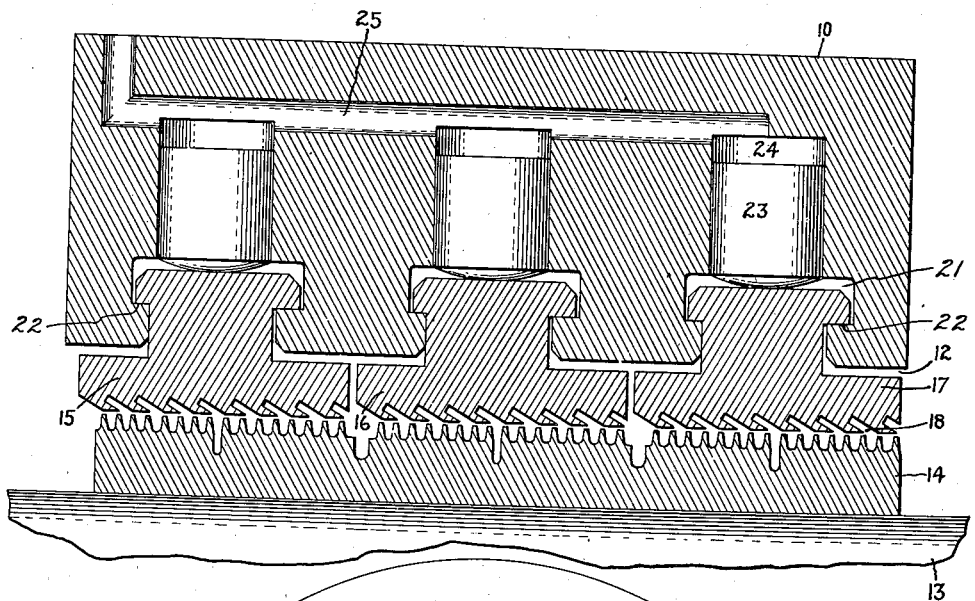
Figure 2:
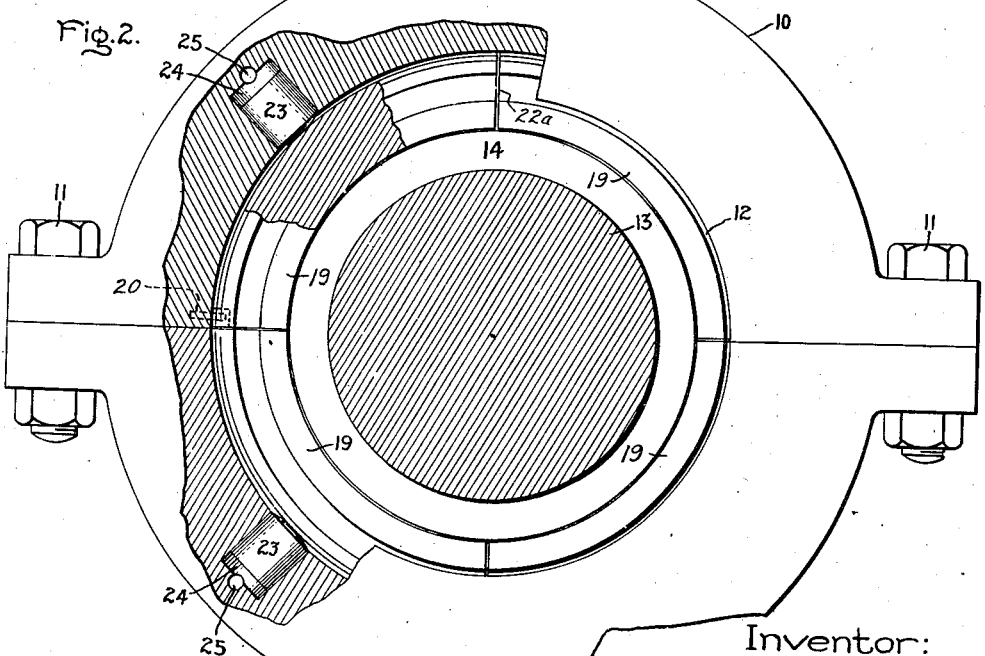

In the drawing Fig. 1 illustrates a sectional view of a packing arrangement embodying my invention, and Fig. 2 is a side view partly in section of Fig. 1.

The arrangement comprises a casing 10 which may form part of an elastic fluid turbine shell. The casing 10 has lower and upper halves joined and flanged together by means of a plurality of bolts 11 and forming an opening 12 through which a shaft 13 projects. In order to reduce leakage of fluid along the shaft past the casing, the shaft is sealed to the casing by means of a packing. In the present instance I have shown by way of example a labyrinth type packing comprising a runner or inner packing ring 14 securely fastened to the shaft and having an outer, cylindrical surface forming a plurality of spaced, annular sealing grooves and teeth. A plurality of conventional stationary packing rings 15, 16 and 17 supported on the casing 10 have inner, cylindrical surfaces formed with spaced sealing grooves 18 and teeth 16 in cooperative relation with the corresponding grooves and teeth of the inner ring 14. Each of the outer packing rings is composed of four segments 19, two of the segments being held in grooves of the upper casing half and two segments being held in grooves of the lower casing half. Angular movement between the packing rings and the casing is limited by pin means 20 held on the casing and projecting in a recess or recesses of the packing rings. The segments of each packing ring are inserted in an undercut groove 21 of the casing and when in position engage shoulders 22 formed by the undercut groove. During operation, in order to assure proper sealing, the segments of the packing rings have to be held in the position in which they engage the shoulders 22. In this position the segments are practically archbound. Their adjacent end faces then may form a small clearance 22a of the order of 3 mils.

The four segments of each ring according to my invention are biased towards each other, that is, into engagement with the shoulders 22 by hydraulically actuated biasing means. In the present example each segment of each packing ring is engaged by a plunger or piston 23 movably disposed in a cylindrical radial bore 24 in the casing 10. The bores are connected by channels 25 for receiving fluid under pressure to actuate the plungers. Gaseous or liquid fluid may be used to force the plungers 23 towards the packing segments. In an elastic fluid turbine the operating fluid of the turbine may be used for actuating the biasing plungers 23. In certain instances, as in high pressure, high temperature steam turbines, it may be desirable to use water under pressure as an actuating medium for the plungers in order simultaneously to cool the packing arrangement. Any leakage of fluid along the plungers may be removed in known manner from the packing arrangement together with other leakage fluid through drain holes (not shown). An arrangement of this type is not subject to limitations due to high pressures, and high temperatures do not affect the life and the characteristics of the biasing means.

Having described the method of operation of my invention, together with the apparatus which I now consider to represent the best embodiment thereof, I desire to have it understood that the apparatus shown is only illustrative and that the invention may be carried out by other means.

What I claim as new and desire to secure by Letters Patent of the United States is:

1. In a turbine, a packing arrangement comprising a stationary casing having an opening, a packing for sealing the casing to a shaft projecting through the opening comprising a packing ring having a plurality of segments for surrounding such shaft, and hydraulically actuated means associated with the casing and independent of the operation of the turbine for holding the segments in position and radially biasing them towards the center of the opening.

2. Packing arrangement comprising a casing having an opening with an annular undercut groove forming a shoulder, a packing ring having a plurality of segments engaging the shoulder and projecting into the opening for sealing the casing to a shaft projecting through the opening, and means comprising a hydraulic motor having a pressure chamber and a plunger disposed therein for radially biasing the segments towards the shoulder.

3. Packing arrangement comprising a casing having an opening for accommodating a shaft, a packing ring having a plurality of segments projecting into the opening to seal the casing to a shaft, a plunger for each segment, a plurality of circumferentially spaced radial bores in the casing defining cylinders for receiving the plungers, and channels formed in the casing to conduct fluid under pressure to the cylinders to actuate the plungers to hold the segments in operative position.

4. Packing arrangement comprising a packing casing having two halves flanged together and forming a plurality of circumferentially spaced radial bores and a channel connected to the bores, a packing ring having a plurality of segments, and a plunger in each bore engaging one of the segments to hold them in sealing position by the action of fluid under pressure supplied to said channel.

5. Elastic fluid turbine for operation with fluid at high temperature comprising a casing having an opening, a shaft projecting through the opening, and a packing for reducing leakage of fluid along the shaft past the opening comprising a ring having a plurality of segments located in the opening and a hydraulic motor for operation with the same kind of fluid as the turbine and having a plunger radially engaging and biasing the segments in sealing position.

JOHN M. DOWNER.